US009258086B2

(12) United States Patent
Chen et al.

(10) Patent No.: US 9,258,086 B2
(45) Date of Patent: Feb. 9, 2016

(54) ALLOCATING PHYSICAL HYBRID ARQ INDICATOR CHANNEL (PHICH) RESOURCES

(75) Inventors: Wanshi Chen, San Diego, CA (US); Jelena M. Damnjanovic, Del Mar, CA (US); Juan Montojo, Nuremberg (DE)

(73) Assignee: QUALCOMM INCORPORATED, San Diego, CA (US)

( * ) Notice: Subject to any disclaimer, the term of this patent is extended or adjusted under 35 U.S.C. 154(b) by 330 days.

(21) Appl. No.: 13/565,704

(22) Filed: Aug. 2, 2012

(65) Prior Publication Data

US 2013/0034028 A1    Feb. 7, 2013

Related U.S. Application Data

(60) Provisional application No. 61/514,757, filed on Aug. 3, 2011.

(51) Int. Cl.
*H04L 1/18* (2006.01)
*H04L 5/00* (2006.01)

(52) U.S. Cl.
CPC ............ *H04L 1/1854* (2013.01); *H04L 1/1861* (2013.01); *H04L 5/001* (2013.01); *H04L 5/0055* (2013.01)

(58) Field of Classification Search
CPC ..... H04L 1/1854; H04L 5/001; H04L 1/1861; H04L 5/0055
See application file for complete search history.

(56) References Cited

U.S. PATENT DOCUMENTS

| 2011/0105050 | A1 | 5/2011 | Khandekar et al. | |
|---|---|---|---|---|
| 2011/0170499 | A1* | 7/2011 | Nayeb Nazar et al. | 370/329 |
| 2011/0268032 | A1 | 11/2011 | Kim et al. | |
| 2011/0317596 | A1 | 12/2011 | Jongren et al. | |
| 2012/0009923 | A1 | 1/2012 | Chen et al. | |
| 2012/0069802 | A1 | 3/2012 | Chen et al. | |
| 2012/0182950 | A1* | 7/2012 | Chung et al. | 370/329 |
| 2012/0257554 | A1* | 10/2012 | Kim et al. | 370/280 |

FOREIGN PATENT DOCUMENTS

| EP | 2728954 A1 | 5/2014 | |
|---|---|---|---|
| JP | 2013516916 A | 5/2013 | |
| WO | WO-2011041623 A1 | 4/2011 | |
| WO | WO2011078581 * | 6/2011 | H04B 7/26 |
| WO | WO-2011085159 A2 | 7/2011 | |
| WO | WO2011034369 * | 9/2011 | H04L 27/26 |

OTHER PUBLICATIONS

3rd Generation Partnership Project "Technical Specification Group Radio Access Network Evolved Universal Terrestrial Radio Access (E-UTRA) Physical layer procedures release 10; Specification No. 36.213" published Dec. 2010.*

Kim et al. WO/2011078581, "Method and Apparatus for Defining Transceiving Timing of a Physical Channel in a TDD Communication System Which Supports Cross-Carrier Scheduling", Jun. 30 2011.*

(Continued)

*Primary Examiner* — Andrew Lai
*Assistant Examiner* — Chuong M Nguyen
(74) *Attorney, Agent, or Firm* — Patterson & Sheridan, LLP

(57) ABSTRACT

Certain aspects of the present disclosure relate to techniques for allocating resources for Physical Hybrid Automatic Repeat Request (HARQ) Indicator Channel (PHICH).

42 Claims, 16 Drawing Sheets

(56) References Cited

OTHER PUBLICATIONS

Chung et al, WIPO Publication No. WO2011034369 "Method and Apparatus for Transceiving Scheduling Signals in a Multi-Carrier Wireless Communication System", Sep. 17 2010.*

"R1-113381—Support of Cross-carrier control for Carrier Aggregation of Different TDD UL-DL Configurations on Different Bands". 3GPP TSG-RAN WG1 #66bis [Online] 2011, pp. 1-4. http://www.3gpp.org/ftp/tsg_ran/WG1_RL1/TSGR1_66b/Docs/R1-113381.zip (accessed Apr. 18, 2012).

International Search Report and Written Opinion—PCT/US2012/049444—ISA/EPO—Nov. 7, 2012.

Sharp: "Solution to PHICH resource collision", 3GPP Draft; R1-101372, 3rd Generation Partnership Project (3GPP), Mobile Competence Centre; 650, Route Des Lucioles; F-06921 Sophia-Anti Polis Cedex; France, vol. RAN WG1, no. San Francisco, USA; 20100222, Feb. 16, 2010, XP050418857, [retrieved on Feb. 16, 2010] the whole document.

Extended European Search Report issued Mar. 20, 2015, in European Application No. 14191870.6, 7 pages.

\* cited by examiner

| PHICH | #PDCCH | UE behavior |
|---|---|---|
| 802 ACK | 0 | Suspend both UL transmissions |
| 804 ACK | 1 | Suspend one of the UL transmissions (e.g., the second in the pair), and transmits the other subframe based on PDCCH |
| 806 NAK | 0 | Re-tx for both subframes |
| 808 NAK | 1 | Re-tx one of the UL transmissions (e.g., the second in the pair), and transmit the other subframe based on PDCCH |
| 810 ACK/NAK | 2 | Tx for both subframes based on the corresponding PDCCHs |

FIG. 8

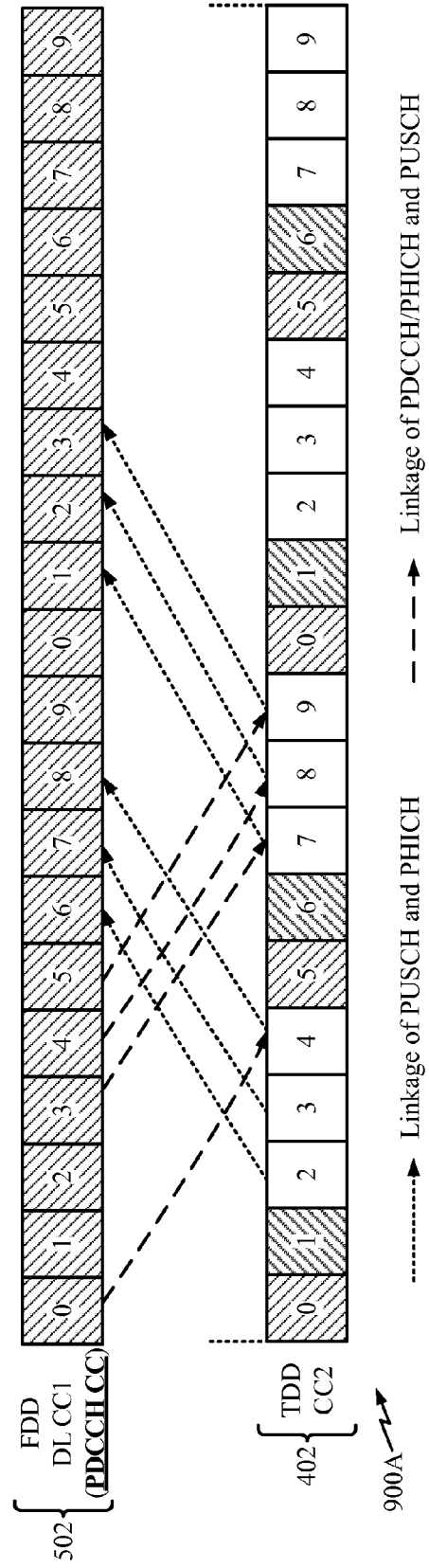
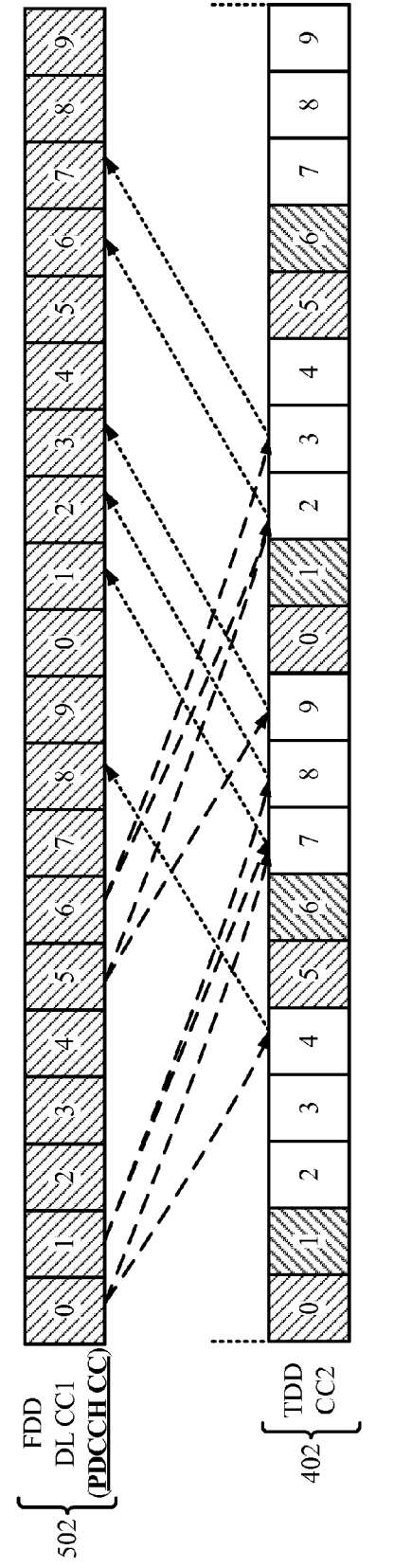
FIG. 9A
FIG. 9B

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | - | - | - | 2 | 1 | - | - | - |
| 1 | 0 | 1 | - | - | 1 | 0 | 1 | - | - | 1 |
| 2 | 0 | 0 | - | 1 | 0 | 0 | 0 | - | 1 | 0 |
| 3 | 1 | 0 | - | - | - | 0 | 0 | 0 | 1 | 1 |
| 4 | 0 | 0 | - | - | 0 | 0 | 0 | 0 | 1 | 1 |
| 5 | 0 | 0 | - | 0 | 0 | 0 | 0 | 0 | 1 | 0 |
| 6 | 1 | 1 | - | - | - | 1 | 1 | - | - | 1 |

FIG. 11

ALLOCATING PHYSICAL HYBRID ARQ INDICATOR CHANNEL (PHICH) RESOURCES

CROSS-REFERENCE TO RELATED APPLICATION

This application claims priority to U.S. Provisional Application Ser. No. 61/514,757, filed on Aug. 3, 2011, which is expressly incorporated by reference herein in its entirety.

BACKGROUND

I. Field

Certain aspects of the present disclosure generally relate to wireless communications and, more particularly, to techniques for allocating resources for Physical Hybrid Automatic Repeat Request (HARQ) Indicator Channel (PHICH).

II. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications. The method generally includes determining that a first Time division duplex (TDD) Component Carrier (CC) with a first uplink (UL)/downlink (DL) subframe configuration is cross carrier scheduled by a second CC with a second UL/DL subframe configuration, determining a Hybrid Automatic Repeat Request (HARQ) timing of uplink transmissions on the first CC, determining availability of Physical HARQ Indicator Channel (PHICH) resources in a subframe on the second CC for uplink transmissions on the first CC based on the determined HARQ timing of uplink transmissions on the first CC, and performing uplink transmissions based on the HARQ resource availability determination.

Certain aspects of the present disclosure provide an apparatus for wireless communications. The apparatus generally includes means for determining that a first Time division duplex (TDD) Component Carrier (CC) with a first uplink (UL)/downlink (DL) subframe configuration is cross carrier scheduled by a second CC with a second UL/DL subframe configuration, determining a Hybrid Automatic Repeat Request (HARQ) timing of uplink transmissions on the first CC, means for determining availability of Physical HARQ Indicator Channel (PHICH) resources in a subframe on the second CC for uplink transmissions on a first CC based on the determined HARQ timing of uplink transmissions on the first CC, and means for performing uplink transmissions based on the HARQ resource availability determination.

Certain aspects of the present disclosure provide an apparatus for wireless communications. The apparatus generally includes at least one processor configured to determine that a first Time division duplex (TDD) Component Carrier (CC) with a first uplink (UL)/downlink (DL) subframe configuration is cross carrier scheduled by a second CC with a second UL/DL subframe configuration, determine a Hybrid Automatic Repeat Request (HARQ) timing of uplink transmissions on the first CC, determine availability of Physical HARQ Indicator Channel (PHICH) resources in a subframe on the second CC for uplink transmissions on the first CC based on the determined HARQ timing of uplink transmissions on the first CC, and perform uplink transmissions based on the HARQ resource availability determination. The apparatus further includes a memory coupled to the at least one processor.

Certain aspects of the present disclosure provide a computer program product for wireless communications. The computer program product generally includes a computer-readable medium comprising code. The code generally includes code for determining that a first Time division duplex (TDD) Component Carrier (CC) with a first uplink (UL)/downlink (DL) subframe configuration is cross carrier scheduled by a second CC with a second UL/DL subframe configuration, determining a Hybrid Automatic Repeat Request (HARQ) timing of uplink transmissions on the first CC, code for determining availability of Physical HARQ Indicator Channel (PHICH) resources in a subframe on the second CC for uplink transmissions on the first CC based on the determined HARQ timing of uplink transmissions on the first CC, and code for performing uplink transmissions based on the HARQ resource availability determination.

Various aspects and features of the disclosure are described in further detail below.

BRIEF DESCRIPTION OF THE DRAWINGS

FIG. 8 illustrates an example table 800 for determining suspension, retransmission or new transmission of subframes based on PHICH and PDCCH in accordance with certain aspects of the disclosure.

FIG. 9A illustrates revising HARQ time line for a cross scheduling 900A of a TDD carrier with UL/DL subframe configuration 0 by an FDD (Frequency Division Duplex) downlink carrier in accordance with certain aspects of the disclosure.

FIG. 9B illustrates revising HARQ time line for a cross scheduling 900B of a TDD carrier with UL/DL subframe configuration 0 by an FDD (Frequency Division Duplex) downlink carrier according to certain aspects of the disclosure.

FIG. 11 illustrates a value of $m_i$ for the 7 LTE TDD UL/DL subframe configurations.

DETAILED DESCRIPTION

Figure 1:
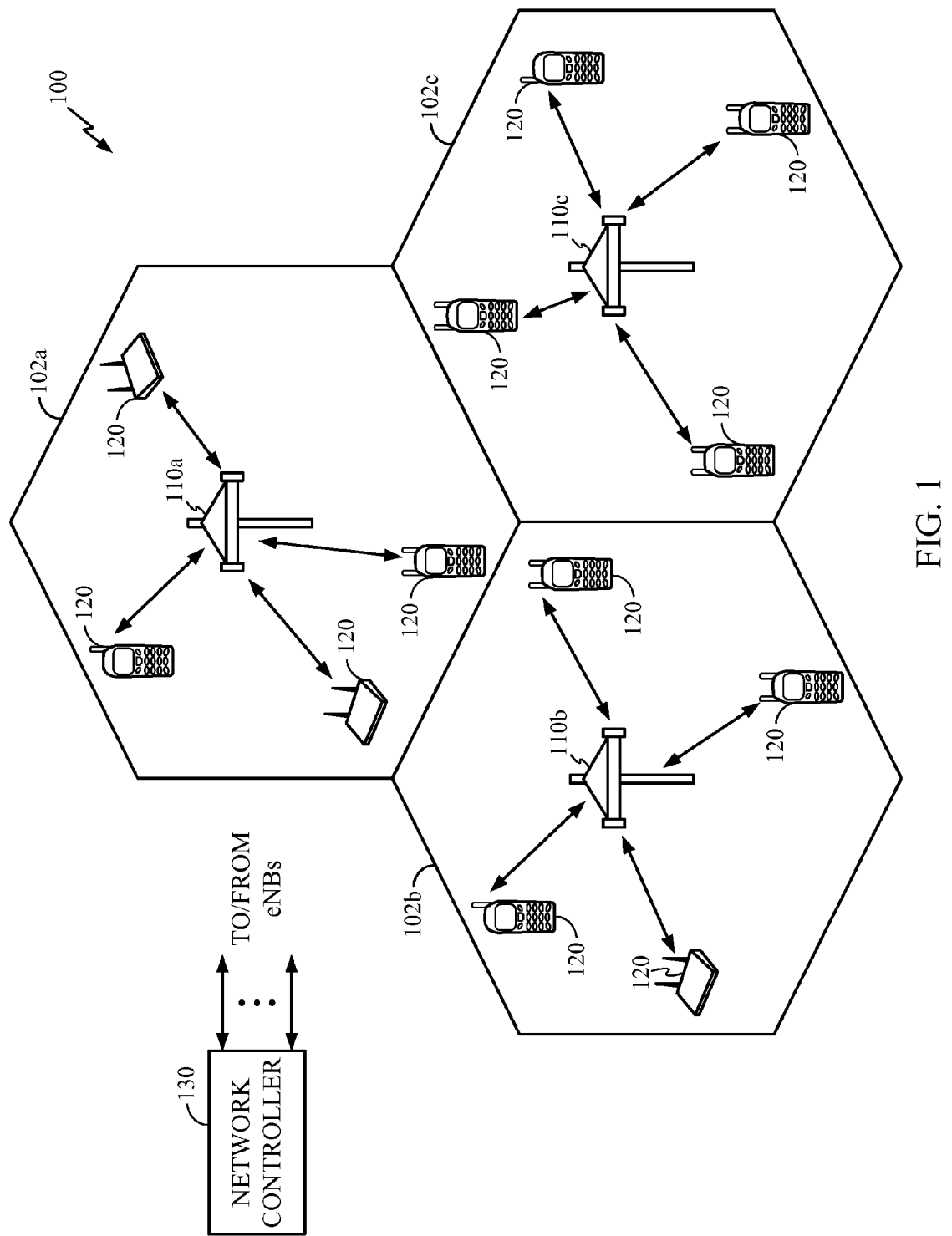
FIG. 1 is a block diagram conceptually illustrating an example of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure may be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in 3GPP LTE, LTE-A, and the Evolved UTRA.

FIG. 1 shows an example wireless communication network 100, which may be an LTE/LTE-A network. Wireless network 100 may include a number of evolved Node Bs (eNBs) 110 and other network entities. An eNB may be a station that communicates with the UEs, and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used. Cells 102 (e.g., 102a, 102b, 102c) are illustrated in FIG. 1.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. An eNB may support one or multiple (e.g., three) cells.

Wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. A relay station may also be referred to as a relay eNB, a relay, etc.

Wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in wireless network 100. For example, macro eNBs may have a high transmit power level (e.g., 20 Watts) whereas pico eNBs, femto eNBs and relays may have a lower transmit power level (e.g., 1 Watt).

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. Network controller 130 may communicate with eNBs 110 via a backhaul. eNBs 110 (e.g., 110a, 110b, 110c) may also communicate with one another, e.g., directly or indirectly via wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a smart phone, a cellular phone, a personal digital assistant (PDA), a tablet, a netbook, a smart book, a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates transmissions between a UE and a serving eNB, which is an eNB designated to serve the UE on the downlink and/or uplink.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
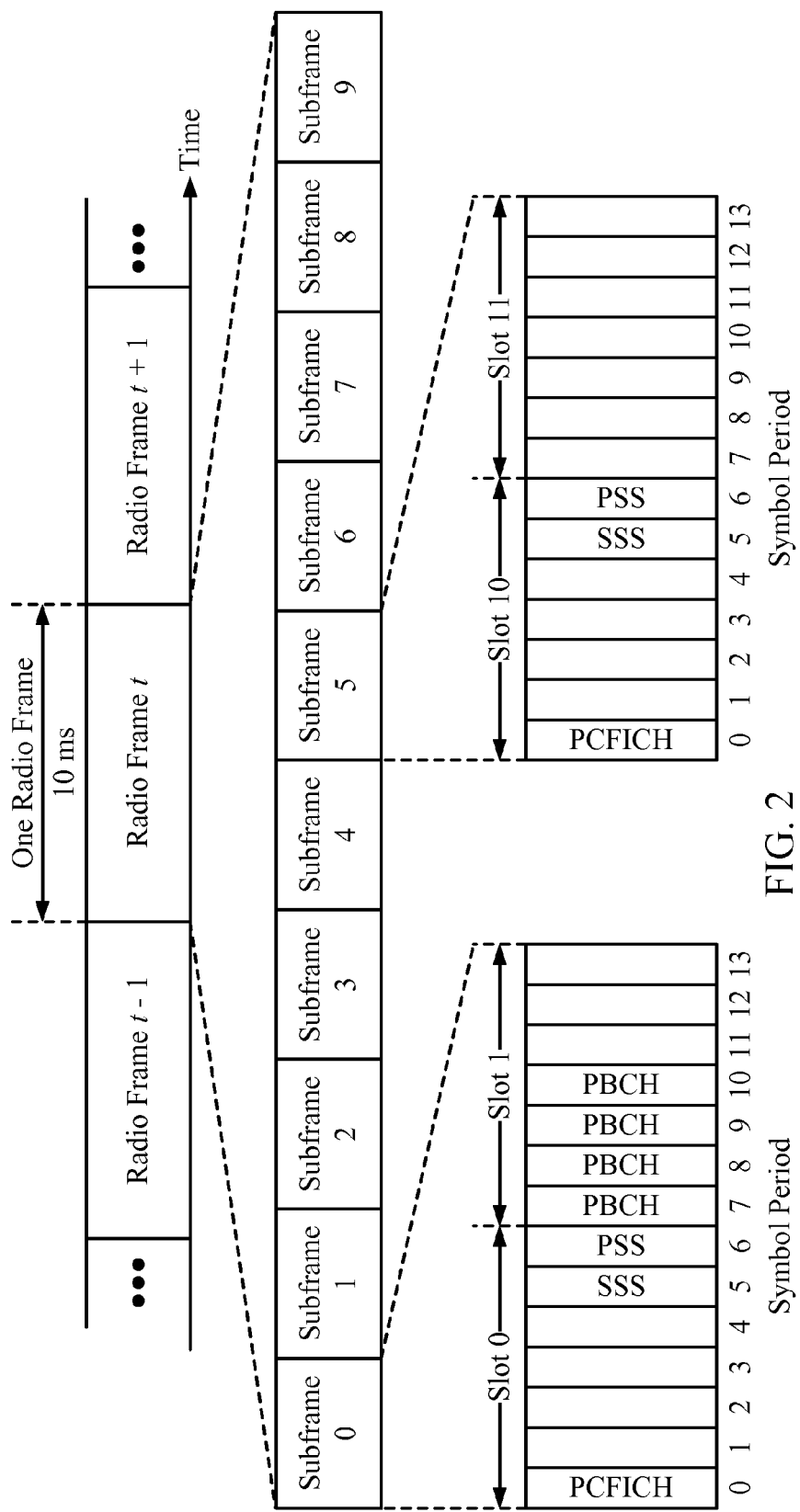
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include $L$ symbol periods, e.g., $L=7$ symbol periods for a normal cyclic prefix (as shown in FIG. 2) or $L=6$ symbol periods for an extended cyclic prefix. The $2L$ symbol periods in each subframe may be assigned indices of 0 through $2L-1$. The available time frequency resources may be partitioned into resource blocks. Each resource block may cover $N$ subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
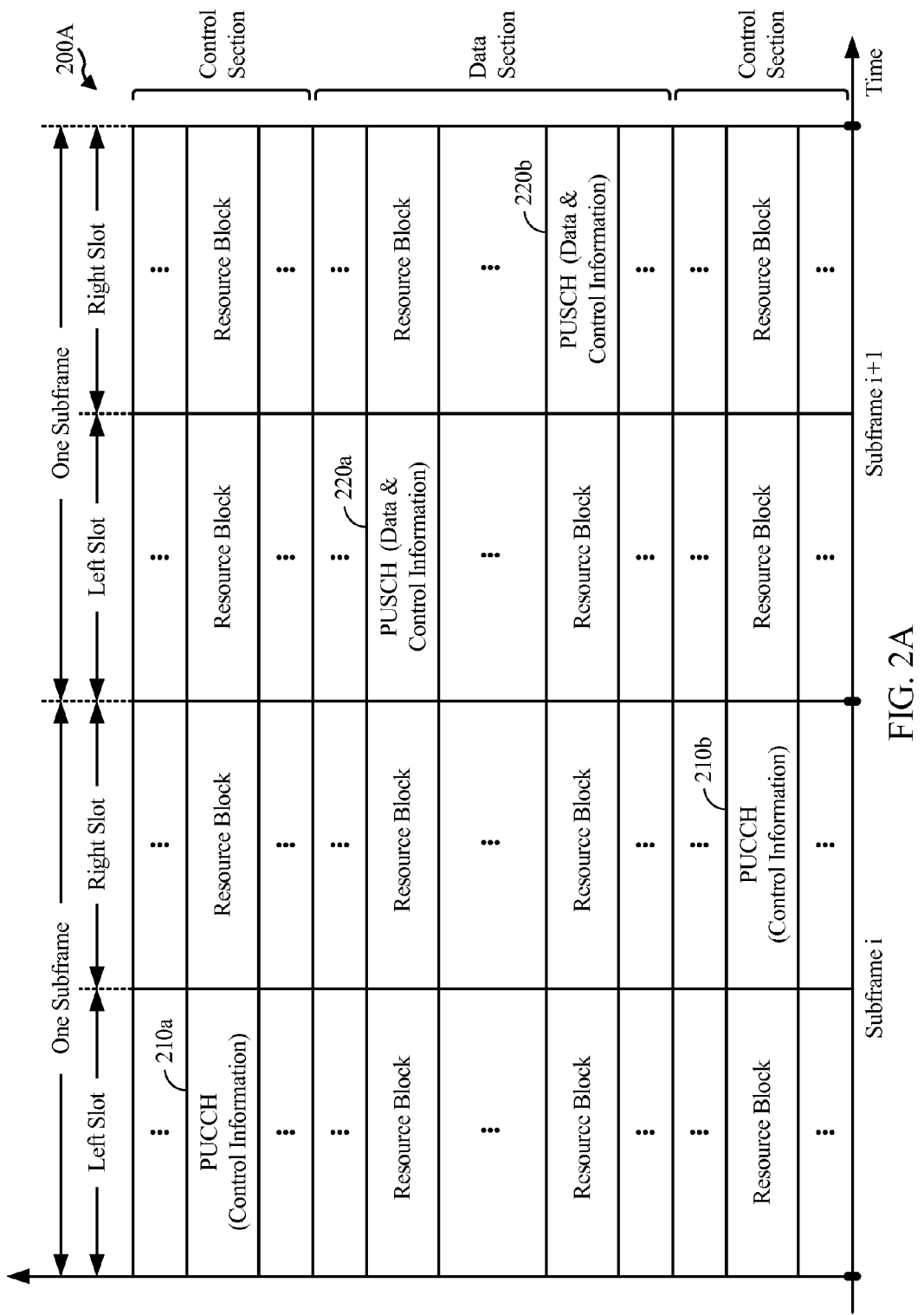
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

The PSS, SSS, CRS, PBCH, PUCCH and PUSCH in LTE are described in 3GPP TS 36.211, entitled, "Evolved Universal Terrestrial Radio Access (E-UTRA); Physical Channels and Modulation," which is publicly available.

Figure 3:
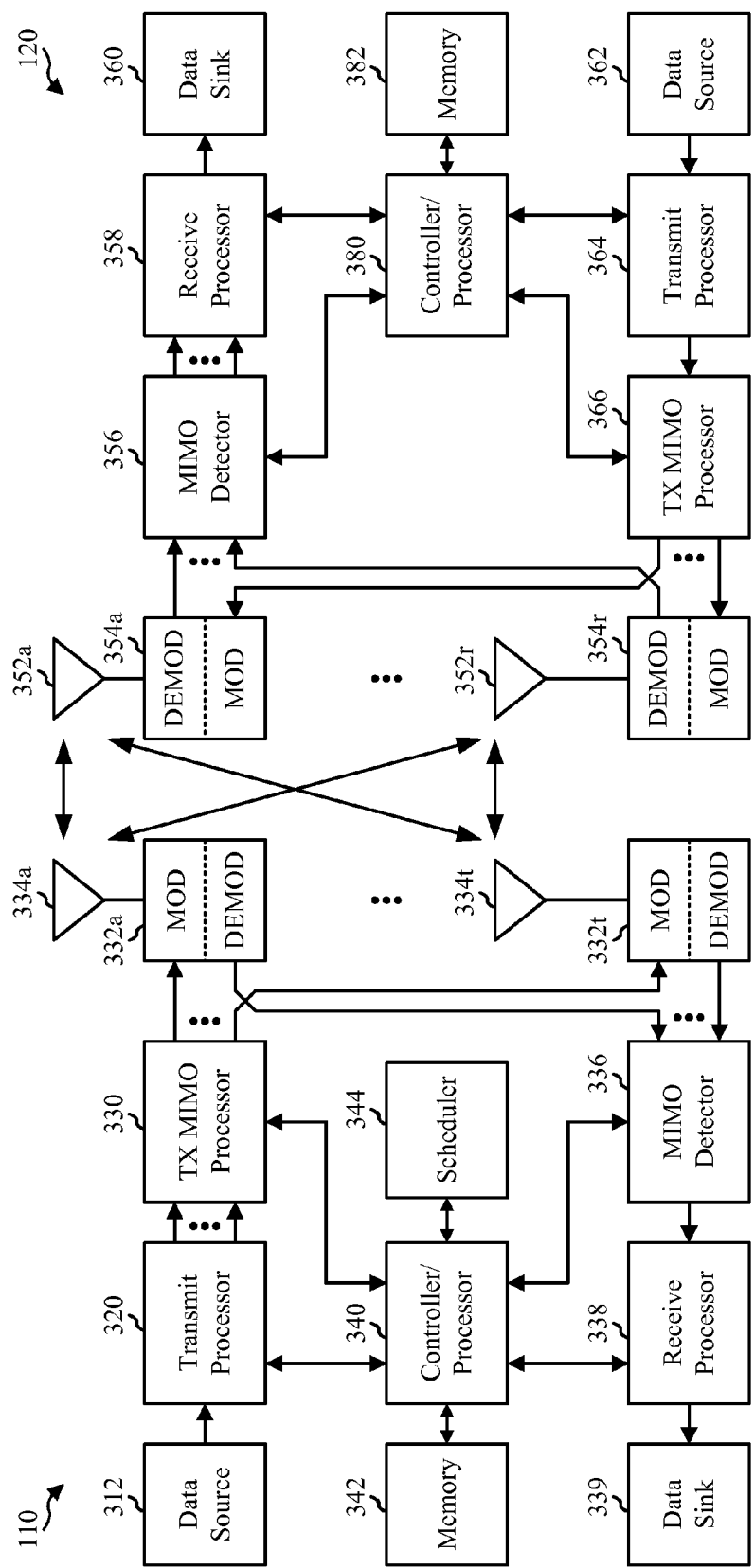
FIG. 3 shows a block diagram conceptually illustrating an example of a Node B in communication with a user equipment device (UE) in a wireless communications network in accordance with certain aspects of the present disclosure.

FIG. 3 shows a block diagram of a design of a base station/eNB 110 and a UE 120, which may be one of the base stations/eNBs and one of the UEs in FIG. 1. Base station 110 may also be a base station of some other type. Base station 110 may be equipped with T antennas 334a through 334t, and UE 120 may be equipped with R antennas 352a through 352r, where in general T≥1 and R≥1.

At base station 110, a transmit processor 320 may receive data from a data source 312 and control information from a controller/processor 340. The control information may be for the PBCH, PCFICH, PHICH, PDCCH, etc. The data may be for the PDSCH, etc. Processor 320 may process (e.g., encode and symbol map) the data and control information to obtain data symbols and control symbols, respectively. Processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At UE 120, antennas 352a through 352r may receive the downlink signals from base station 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for UE 120 to a data sink 360, and provide decoded control information to a controller/processor 380.

On the uplink, at UE 120, a transmit processor 364 may receive and process data (e.g., for the PUSCH) from a data source 362 and control information (e.g., for the PUCCH) from controller/processor 380. Processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to base station 110. At base station 110, the uplink signals from UE 120 may be received by antennas 334, processed by demodulators 332, detected by a MIMO detector 336 if applicable, and further processed by a receive processor 338 to obtain decoded data and control information sent by UE 120. Processor 338 may provide the decoded data to a data sink 339 and the decoded control information to controller/processor 340.

Controllers/processors 340 and 380 may direct the operation at base station 110 and UE 120, respectively. Controller/processor 340, transmit processor 320, TX MIMO processor 330, receive processor 338, and/or other processors and modules at base station 110 may perform or direct operations 600 in FIG. 6 and/or other processes for the techniques described herein. At UE 120, controller/processor 380, transmit processor 364, TX MIMO processor 366, receive processor 358, and/or other processors and modules may perform or direct operations 600 in FIG. 6 and/or other processes for the techniques described herein. Memories 342 and 382 may store data and program codes for base station 110 and UE 120, respectively. A scheduler 344 may schedule UEs for data transmission on the downlink and/or uplink.

Physical Hybrid ARQ Indicator Channel (PHICH) is a downlink channel which carries Hybrid ARQ (HARQ) ACK/NACK information indicating whether an eNodeB has correctly received a transmission on the Physical Uplink Shared Channel (PUSCH). In certain aspects, multiple PHICHs (for different UEs) are mapped to the same set of downlink resource elements. In certain aspects, a Master Information Block (MIB) carries PHICH resource information. The MIB is a block of system information which includes a limited number of most frequently transmitted parameters which are essential for a UE's initial access to the network. The parameters typically include downlink system bandwidth, an indicator of the resources allocated to the HARQ acknowledgement signaling in the downlink, and the System Frame Number.

In certain aspects, the MIB includes a bit indicating whether the PHICH is of normal or extended duration. For normal duration, the PHICH may only be in a first OFDM symbol. However, for extended duration, the PHICH may be in two or three OFDM symbols, depending on a subframe type of the subframe associated with the PHICH. Therefore, in some cases additional resources than normal may be reserved for the PHICH in at least one downlink subframe of the second CC for HARQ responses of uplink transmissions.

In certain aspects, the MIB includes two bits indicating a total number of PHICH resources. There may be four possible sizes ($N_g$) of the PHICH resources, including ⅙, ½, 1 and 2, where a number of PHICH groups ($N_{PHICH}^{group}$) is given by ceiling ($N_g * (N_{RB}^{DL}/8)$) for a normal Cyclic Prefix (CP), and $2*$ceiling ($N_g*(N_{RB}^{DL}/8)$) for extended CP, where $N_{RB}^{DL}$ is the number of Resource Blocks (RBs) in downlink (DL).

In certain aspects, based on the Physical Control Format Indicator Channel PCFICH and PHICH, a UE may determine a left over resource for the Physical downlink Control Channel (PDCCH).

Table-1 illustrates seven UL/DL configurations for LTE TDD. 'D' represents a subframe for downlink transmission, 'S' represents a special subframe used for a guard time, and 'U' represents a subframe for uplink transmission.

TABLE 1

| UL/DL Con- figuration | DL to UL Switch Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In certain aspects, for TDD (Time Division Duplex), the amount of PHICH resource is further subframe dependent, e.g., ($m_i * N_{PHICH}^{group}$). In certain aspects, for TDD with DL/UL configuration 0, $m_i=2$ for subframes 0 and 5. For other configurations, $m_i=1$ or 0, where 0 corresponds to a case where there is no PHICH resource.

In certain aspects, for a UE, the PHICH resource for a PUSCH transmission may be identified by a group index ($n_{PHICH}^{group}$) and a sequence index within the group ($n_{PHICH}^{seq}$). Further, a mapping from a PUSCH transmission to the PHICH resource may be based on one or more of:

$N_{PHICH}^{group}$ $I_{PRB\_RA}^{lowest\_index}$ indicating a lowest PRB (Physical Resource Block) index in the first slot of the corresponding PUSCH transmission.

$n_{DMRS}$ indicating a cyclic shift for DM-RS (Demodulation Reference Signal) field.

$N_{SF}^{PHICH}$ indicating a spread factor size used for PHICH modulation $I_{PHICH}$ which is typically 1 for TDD UL/DL configuration 0 with PUSCH transmission in subframes 4 or 9, and otherwise 0.

Figure 4:
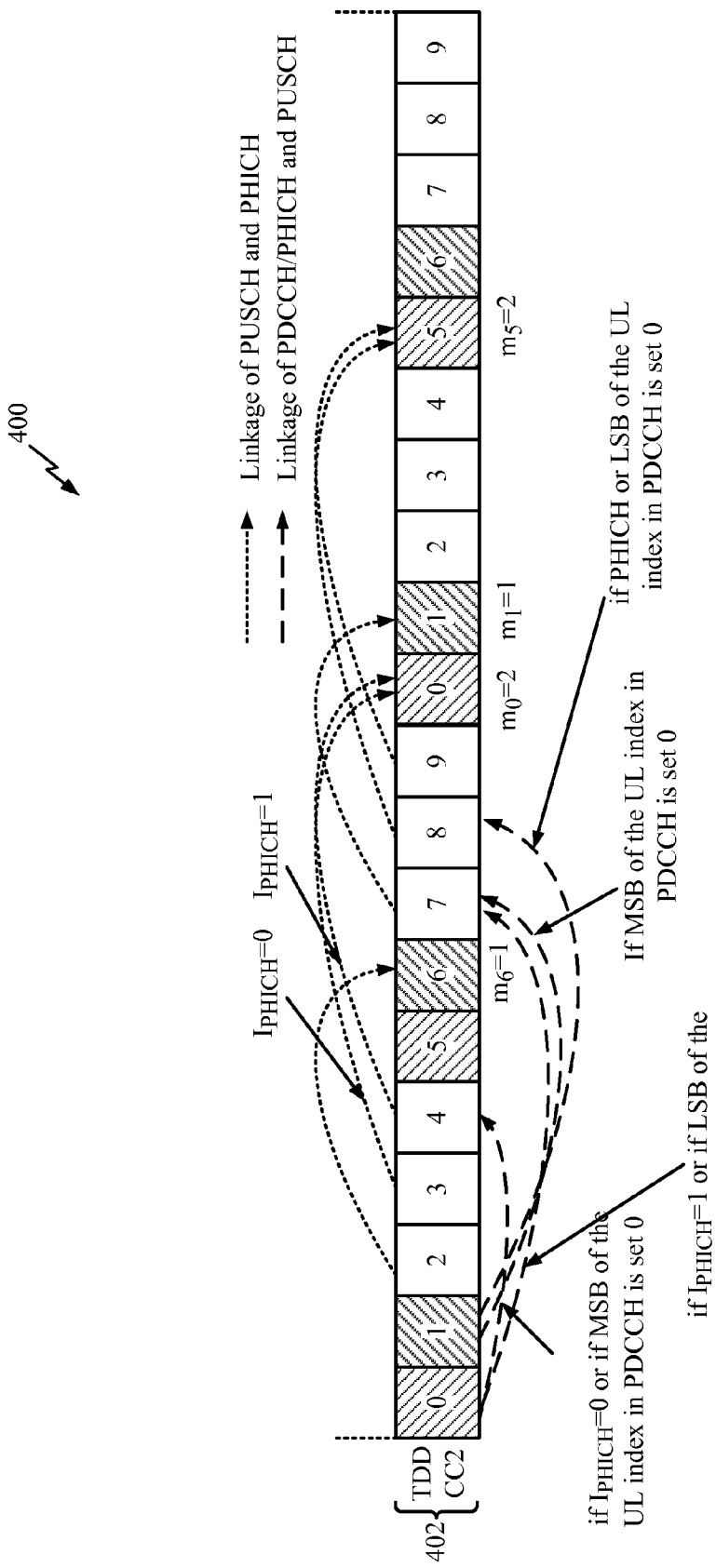
FIG. 4 illustrates an example PHICH resource mapping 400 for TDD carrier with UL/DL subframe configuration 0 in accordance with certain aspects of the disclosure.

FIG. 4 illustrates an example PHICH resource mapping 400 for TDD carrier with UL/DL subframe configuration 0 in accordance with certain aspects of the disclosure. TDD CC (Component Carrier) 2 402 is a TDD carrier with UL/DL subframe configuration 0. In TDD UL/DL configuration 0, each 5 ms half frame (e.g., subframes 0-4 and 5-9) of a radio frame (subframes 0-9) includes a downlink subframe, a special subframe and three uplink subframes. For example, as shown in FIG. 4 subframes 0 and 5 are downlink subframes, subframes 1 and 6 are special subframes, and subframes 2-4 and 7-9 are uplink subframes.

In certain aspects, for TDD UL/DL configuration 0, the downlink subframes and the special subframes may be used for downlink PHICH to provide HARQ response for uplink transmissions on the uplink subframes. Thus, every 5 ms half frame in the TDD UL/DL configuration 0 includes only two PHICH resources for responding to UL transmissions on three uplink subframes. At least one of the two PHICH resources in every half frame must handle HARQ response for uplink transmissions on two subframes. For example, as shown in FIG. 4, for TDD UL/DL configuration 0, double the PHICH resource ($m_i=2$) is reserved on subframes 0 and 5 so that these subframes can handle responses for uplink transmissions on two subframes.

As shown in FIG. 4, PHICH resource associated with subframe 0 handles HARQ responses for uplink transmissions on subframes 3 and 4, and that of subframe 5 handles HARQ responses for uplink transmissions on subframes 8 and 9. Further, as shown, subframe 1 handles responses for uplink subframe 7 and subframe 6 handles responses for uplink subframe 2. In certain aspects, PHICH for PUSCH in subframes 3 and 4 (or 8 and 9) is differentiated by $I_{PHICH}$.

In an aspect, a UE may cross schedule data transmission from a first carrier using a first configuration to a second carrier using a second configuration. For example, a UE may receive PHICH control information on a first carrier for PUSCH data transmitted on another carrier. In certain aspects, when a TDD UL/DL configuration 0 carrier is cross scheduled by another FDD carrier or another TDD carrier with a different UL/DL configuration, the PHICH resource for subframes 0 and 5 of the other FDD or TDD carrier must be doubled for proper HARQ response of uplink transmissions on the uplink subframes of the TDD carrier with configuration 0.

Figure 5:
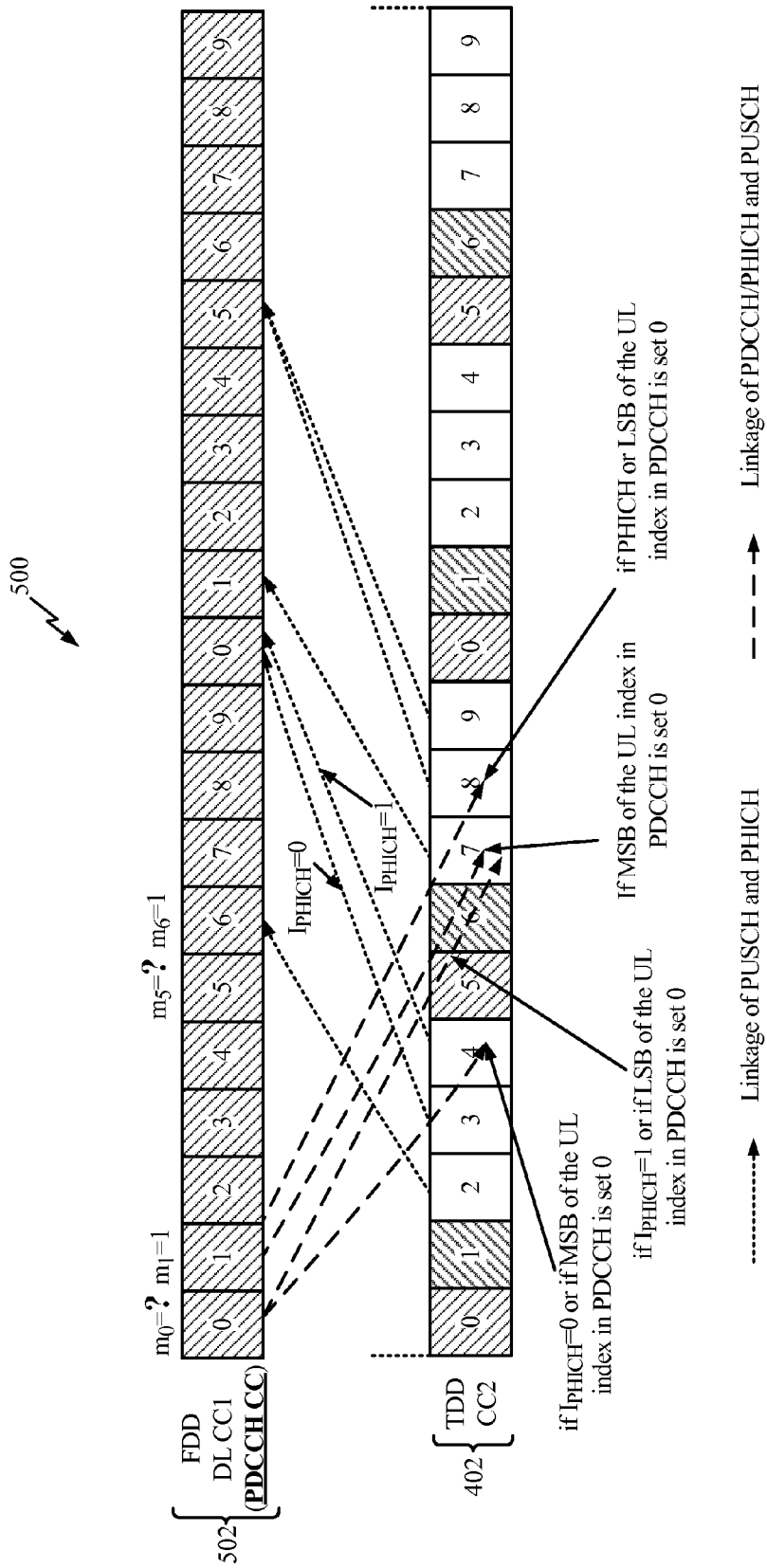
FIG. 5 illustrates a cross scheduling 500 of a TDD carrier with UL/DL subframe configuration 0 by an FDD (Frequency Division Duplex) downlink carrier in accordance with certain aspects of the disclosure.

For example, FIG. 5 illustrates a cross scheduling 500 of a TDD carrier with UL/DL subframe configuration 0 by an FDD (Frequency Division Duplex) downlink carrier in accordance with certain aspects of the disclosure. FDD DL CC1 502 is a FDD downlink carrier and TDD CC2 402 as noted above, is a TDD carrier with UL/DL subframe configuration 0. As shown in FIG. 5, FDD DL CC1 cross schedules the TDD CC2 with UL/DL configuration 0. As discussed above, PHICH resource associated with subframes 0 and 5 of FDD DL CC1 must be doubled for proper HARQ response of uplink transmission on uplink subframes of TDD CC2. For example, The PDCCH CC only has $m_i=1$ for any subframe I, while the TDD CC2 ideally needs $m_i=2$ for some subframes (e.g. 0 and 5) for the same UL HARQ operation.

In certain aspects, the amount of PHICH resource impacts PDCCH detection for all UEs in a cell. Thus, the PHICH resource for the PDCCH CC may not be simply doubled without extra care.

Figure 6:
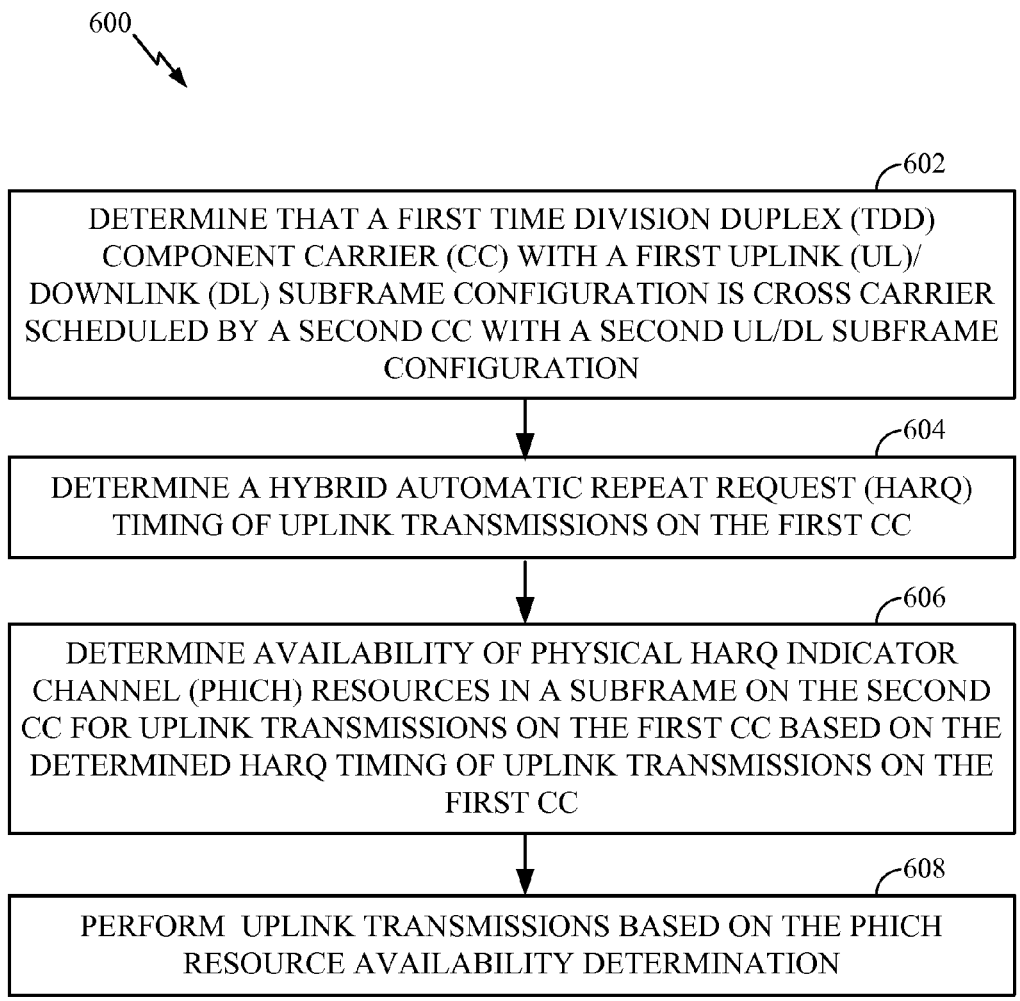
FIG. 6 illustrates example operations 600 for allocation of Physical Hybrid ARQ Indicator Channel (PHICH) in accordance with certain aspects of the disclosure.

FIG. 6 illustrates example operations 600 for allocation of Physical Hybrid ARQ Indicator Channel (PHICH) in accordance with certain aspects of the disclosure. Operations 600 begin, at 602 by determining that a first Time division duplex (TDD) Component Carrier (CC) with a first uplink (UL)/downlink (DL) subframe configuration is cross carrier scheduled by a second CC with a second UL/DL subframe configuration. At 604, a Hybrid Automatic Repeat Request (HARQ) timing of uplink transmissions on the first CC is determined. At 606, availability of Physical HARQ Indicator Channel (PHICH) resources in a subframe on the second CC for uplink transmissions on the first CC is determined based on the determined HARQ timing of uplink transmissions on the first CC. At 608, uplink transmissions are performed, based on the HARQ resource availability determination.

According to certain aspects, a UE may determine that the UL Hybrid Automatic Repeat Request (HARQ) timing of uplink transmissions on the first CC is based on the UL HARQ timing of uplink transmissions specified for the second CC. In some cases, the set of uplink subframes in the second CC may be a subset of a set of uplink subframes in the first TDD CC. Alternatively, the set of uplink subframes in the second CC may be a superset of the set of uplink subframes in the first TDD CC.

According to certain aspects, a UE may determine that the UL Hybrid Automatic Repeat Request (HARQ) timing of uplink transmissions on the first CC is based on the UL HARQ timing of uplink transmissions specified for the first CC.

According to certain aspects, the UE may determine the PHICH resources available and, in response to the determination, determine a HARQ response based on the determined PHICH resource.

According to certain aspects, the HARQ response may be determined to be a negative acknowledgment and a UE may perform a non-adaptive uplink data transmission.

According to certain aspects, the PHICH resource may be determined to be unavailable and, in response to the determination, the UE may suspend an uplink data transmission.

According to certain aspects, the PHICH resource may be determined to be unavailable and a downlink control channel scheduling an uplink grant may be detected, and the UE may perform an uplink data transmission in response to the uplink grant.

Figure 7:
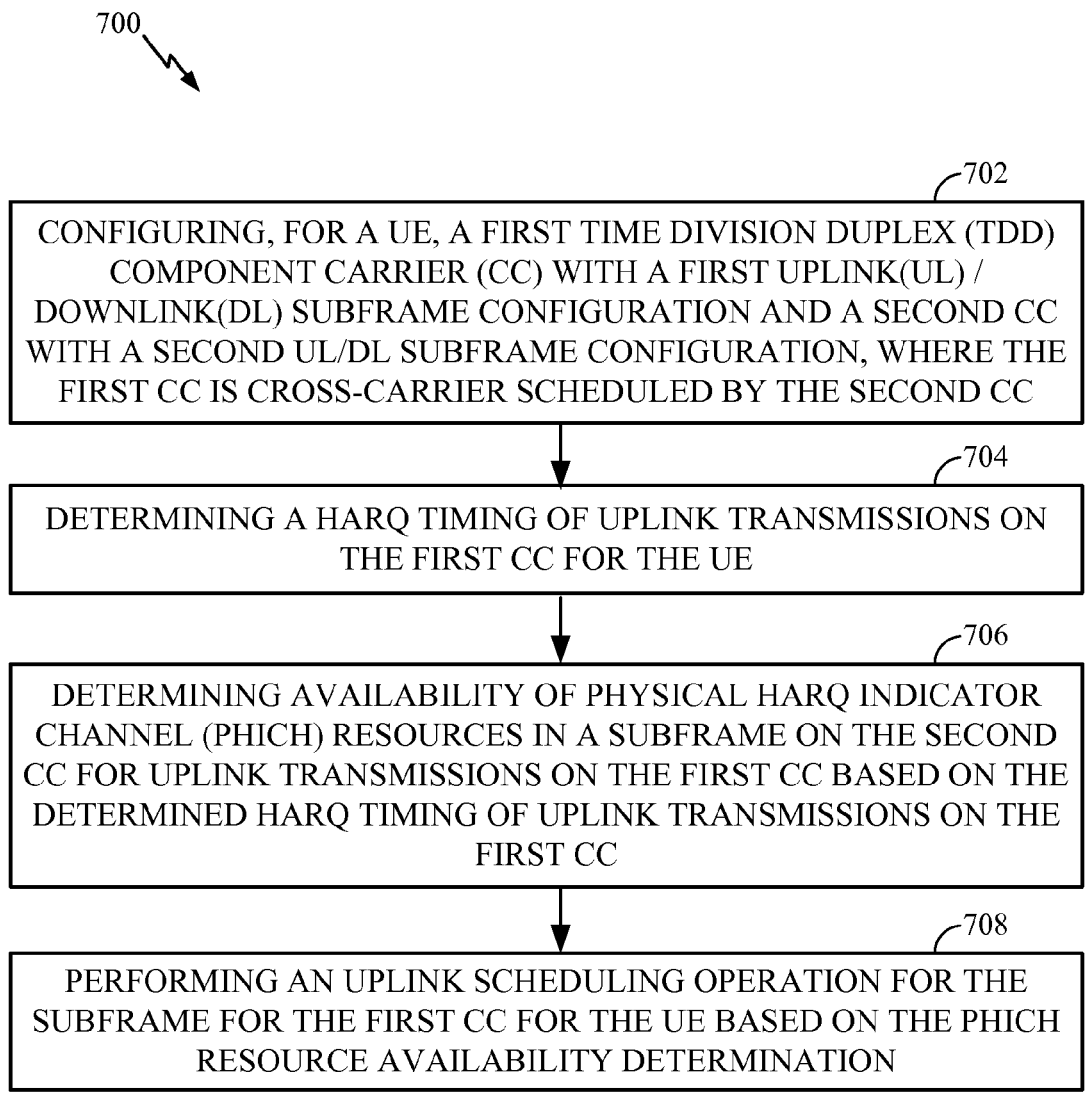
FIG. 7 illustrates example operations 700 for allocation of Physical Hybrid ARQ Indicator Channel (PHICH) in accordance with certain aspects of the disclosure.

FIG. 7 illustrates example operations 700 for allocation of Physical Hybrid ARQ Indicator Channel (PHICH) in accordance with certain aspects of the disclosure. The operations 700 may be performed, for example, by an eNB.

Operations 700 begin, at 702 by configuring, for a UE, a first Time division duplex (TDD) Component Carrier (CC) with a first uplink (UL)/downlink (DL) subframe configuration and a second CC with a second UL/DL subframe configuration, where the first CC is cross-carrier scheduled by the second CC. At 704, the eNB determines a Hybrid Automatic Repeat Request (HARQ) timing of uplink transmissions on the first CC for the UE. At 706, the eNB determines availability of Physical HARQ Indicator Channel (PHICH) resources in a subframe on the second CC for uplink transmissions on the first CC based on the determined HARQ timing of uplink transmissions on the first CC. At 708, the eNB performs an uplink scheduling operation for the subframe for the first CC for the UE based on the PHICH resource availability determination.

In certain aspects, double the PHICH resource may be reserved on the PDCCH CC in subframes 0 and 5 for the TDD CC 0, i.e., $m_0=m_5=2$, where a first set of PHICH resource may be defined same as in a regular $m_i=1$ case applicable to both FDD and TDD PDCCH CC, and a second set of PHICH resource may be defined applicable and visible only to UEs under cross-carrier scheduling from the PDCCH CC to TDD configuration 0. In an aspect, for all other UEs (which are not cross scheduled), the second extra set of PHICH resource is transparent.

In certain aspects, the second set of PHICH resource is defined by re-using some (e.g., reserving a portion of) PDCCH resource. The re-used PDCCH resource may be picked to minimize PDCCH scheduling impact on other UEs. For example, a last Control Channel Element (CCE) of the PDCCH resource pool may be picked for re-use, as the last CCE typically is the least used for PDCCH.

In an aspect, the number of PDCCH CCEs needed for the re-interpretation depends on the PHICH resource size. For instance, if $N_g=1$, $N_{RB}^{DL}=100$, for normal CP, we have ceiling (1*100/8)=13 PHICH groups, or 156 REs (each group is 12 REs), or 5 CCEs (each CCE is of 36 REs).

In certain aspects, this approach is backward compatible and fully flexible for the UL HARQ operation. However, it may require large PDCCH resources, and hence impose significant impact on PDCCH capacity.

The usage of $I_{PHICH}$ for PHICH resource mapping may be defined (as defined in 36.213 std) as follows:

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH}$$

The above definition needs double PHICH resources. In an aspect only a single set of PHICH resource ($m_0=m_5=1$) may still be reserved, and $I_{PHICH}$ may be used differently based on the single set of PHICH resource. For example, $I_{PHICH}$ can be used as an offset to PRB ($I_{PRB\_RA}$), or DM-RS, or a combination of both. It must be noted that in UL MIMO operation, two PHICHs are needed for two UL codewords and the second one is derived based on $I_{PRB\_RA}+1$. One example is I-Q bundling, i.e., if the first UL subframe is mapped to an I (or Q)-branch, the second UL subframe is mapped to the Q (or I)-branch, or vice versa.

In an aspect, if $I_{PHICH}$ is used as an offset of DM-RS, we may have:

$$n_{PHICH}^{group} = (I_{PRB\_RA} + n_{DMRS} + I_{PHICH}) \bmod N_{PHICH}^{group}$$

$$n_{PHICH}^{seq} = (\lfloor I_{PRB\_RA}/N_{PHICH}^{group} \rfloor + n_{DMRS} + I_{PHICH}) \bmod 2N_{SF}^{PHICH}$$

In certain aspects, DM-RS may be used to alleviate any PHICH collisions. It is typically up to eNB implementation to avoid PHICH collisions for re-transmissions (especially when inter-subframe PUSCH hopping is enabled). From a UE perspective, the two UL subframes requiring PHICH may always fall into different PHICH resources Otherwise, it may be an error event for the UE.

In certain aspects a time domain bundling operation may be performed for the two PHICHs responding to the pair of UL subframes. For example, the bundling operation may include performing a logical AND operation, i.e. if both HARQ responses are ACK, an ACK is transmitted, otherwise a NAK is transmitted. In an aspect, the PHICH resource may be mapped based on the starting PRB of the first slot of the first subframe of the pair of UL subframes. In certain aspects, a combination of the single PHICH and PDCCH may determine which subframe is for suspension, retransmission or new transmission.

FIG. 8 illustrates an example table 800 for determining suspension, retransmission or new transmission of subframes based on PHICH and PDCCH in accordance with certain aspects of the disclosure. At 802, if PHICH is ACK and PDCCH is 0 the UE suspends both UL transmissions. At, 804, if PHICH is ACK and PDCCH is 1, the UE suspends one of the UL transmissions (e.g., the second in pair), and transmits the other subframe based on PDCCH. At 806, if PHICH is NAK and PDCCH is 0, the UE re-transmits both subframes. At 808, if PHICH is NAK and PDCCH is 1, the UE re-transmits one of the UL transmissions (e.g., the second in pair), and transmits the other subframe based on PDCCH. At 810, if the PHICH is ACK/NAK and the PDCCH is 2, the UE transmits both subframes based on the corresponding PDCCHs.

In certain aspects, a UL HARQ time line is revised such that each uplink subframe of the TDD CC2 402 may be mapped to a PHICH resource associated with a separate downlink subframe in a second CC cross scheduling the TDD CC2 (e.g. FDD DL CC1 502). For example, revising UL HARQ time line may be based on a 4 ms timing between PUSCH and PHICH as in FDD.

However, for some combinations of TDD of different configurations, such revision is not possible. For example, for configuration 6 where there are only 5 downlink subframes, it is impossible to have one-to-one mapping for the 6 UL subframes in TDD #0. Thus, in certain aspects, the HARQ response may be limited up to 5 UL subframes in case of configuration #5 and configuration #0 TDD carrier aggregation (CA), while for all other TDD configurations with #0, a one-to-one mapping may be defined since all other TDD configurations have at least 6 downlink subframes. In certain aspects, the number of UL HARQ processes for TDD configuration #0 can also be revised from 7 to 6, where for each HARQ process, the RTT (round trip time) is fixed at 10 ms.

With revised timing, UL scheduling decisions for an UL subframe are not made in the same subframe. In certain aspects, this may lead to some UL scheduling complexity.

FIG. 9A illustrates revising HARQ time line for a cross scheduling 900A of a TDD carrier with UL/DL subframe configuration 0 by an FDD (Frequency Division Duplex) downlink carrier in accordance with certain aspects of the disclosure. The timeline revise of FIG. 9A is based on a HARQ Round Trip Time (RTT) of 8 ms for the TDD configuration 0. As shown revising the HARQ time line leads to a one to one mapping between the uplink subframes of TDD CC2 and downlink subframes of FDD DL CC1.

FIG. 9B illustrates revising HARQ time line for a cross scheduling 900B of a TDD carrier with UL/DL subframe configuration 0 by an FDD (Frequency Division Duplex) downlink carrier according to certain aspects of the disclosure. The timeline revise of FIG. 9B is based on HARQ RTTs of 8, 10, 11 ms for the TDD configuration 0.

In certain aspects, other HARQ RTT for TDD #0 is possible, e.g., aligning UL scheduling delay/flexibility for the cross-carrier scheduled UEs and same-carrier scheduled UEs with UL transmissions on TDD #0, and PUSCH to PHICH with a fixed 4 ms delay. Other RTTs may include 10 ms and 11 ms.

Figure 10:
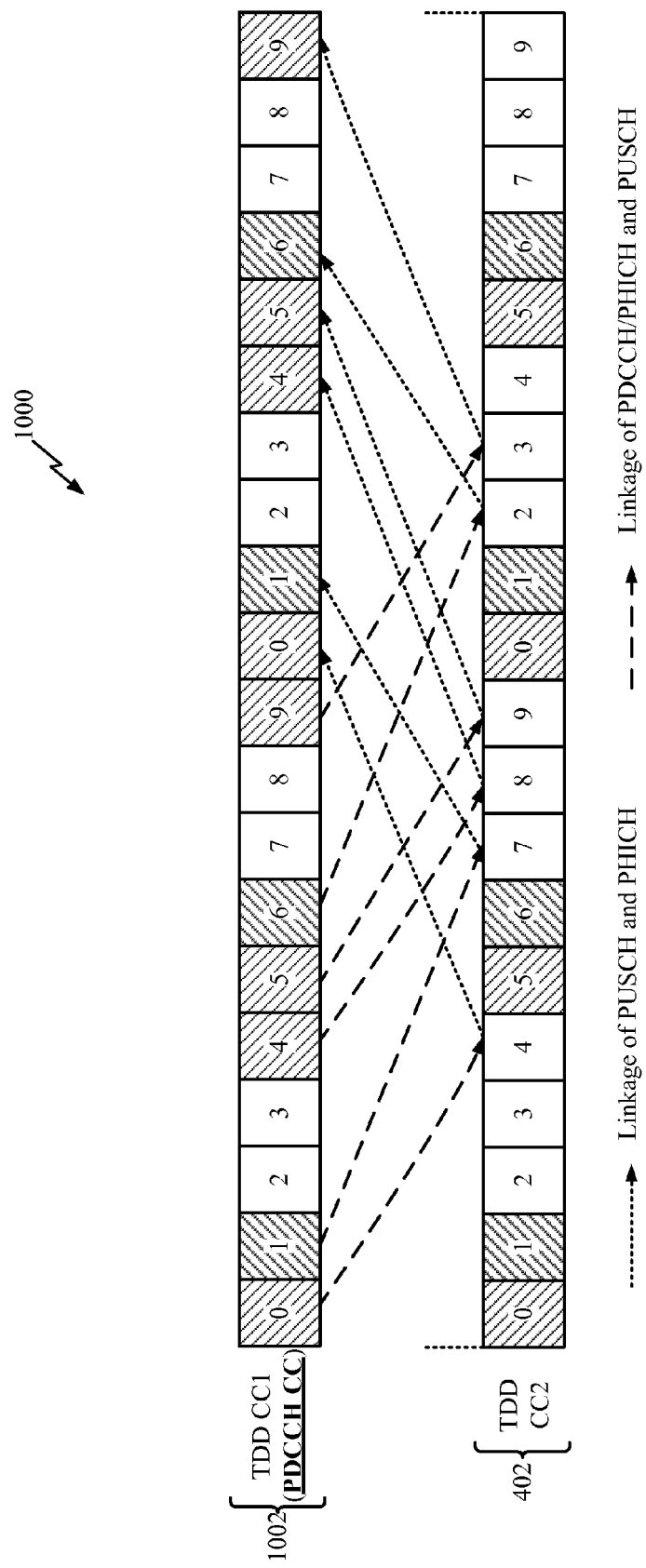
FIG. 10 illustrates revising HARQ time line for a cross scheduling 1000 of a TDD carrier with UL/DL subframe configuration 0 by another TDD carrier with UL/DL subframe configuration 1 according to certain aspects of the disclosure.

FIG. 10 illustrates revising HARQ time line for a cross scheduling 1000 of a TDD carrier with UL/DL subframe configuration 0 by another TDD carrier with UL/DL subframe configuration 1 according to certain aspects of the disclosure. TDD CC1 1002 is a TDD CC with UL/DL subframe configuration 1. In FIG. 10, a 10 ms HARQ RTT is maintained for TDD CC2. In certain aspects there may be two separate delay combinations, e.g., 4+6 or 6+4. The first number typically is the delay between PDCCH/PHICH & PUSCH and the second number typically is the delay between PUSCH and PDCCH/PHICH. In certain aspects, other RTTs are also possible for this configuration.

Other alternatives for the carrier aggregation are also possible. For example, higher order modulation for PHICH (QPSK), asynchronous UL H-ARQ, using a new PHICH design occupying resources in PDSCH region. Another alternative may be, one PHICH+PDCCH. For example, only one set of PHICH resource for one $I_{PHICH}$ (e.g., fixed for $I_{PHICH}$=0, layer 3 configured for 0 or 1), while the other $I_{PHICH}$ is not supported (but relying on PDCCH for re-transmissions).

Additional PHICH management issues exist for cases of cross carrier scheduling between TDD CCs with different UL/DL configurations.

FIG. 11 illustrates a value of $m_i$ for the 7 TDD configurations shown in Table 1. As shown in FIG. 11, for one or more subframes of certain UL/DL configurations, $m_i$=0. In certain aspects, when TDD CCs having different UL/DL configurations are cross scheduled, this may lead to unavailability of PHICH resources for providing HARQ responses to uplink transmissions on cross scheduled uplink subframes.

Figure 12:
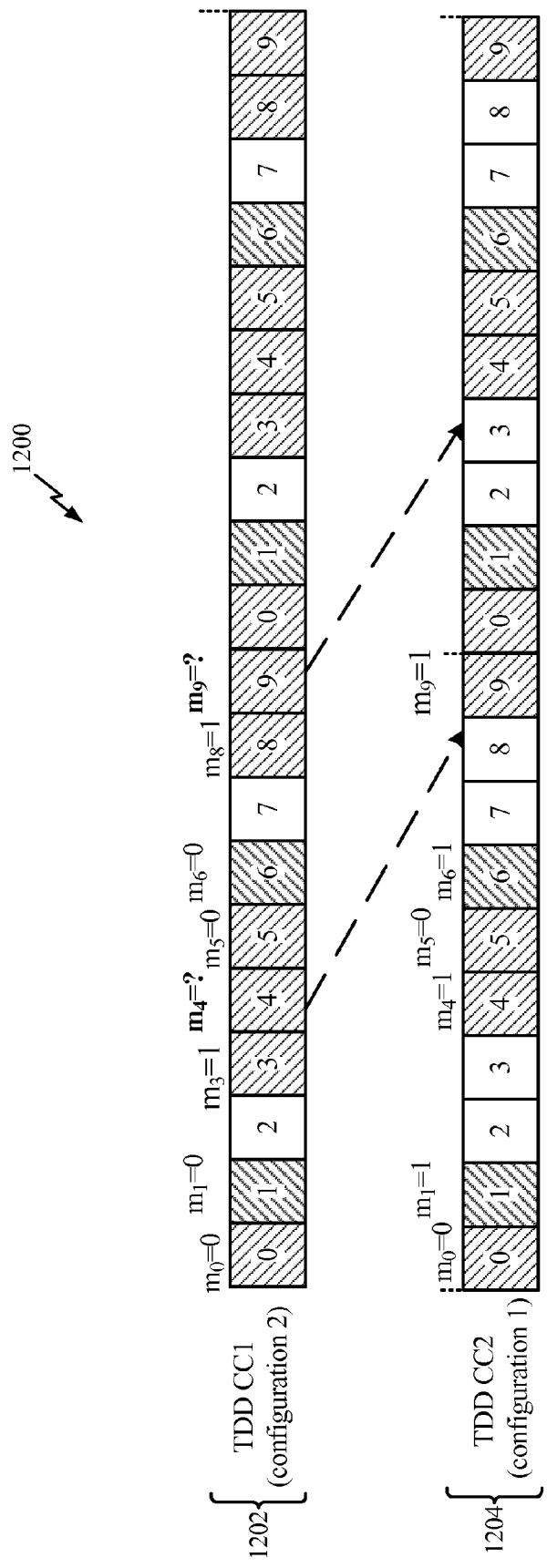
FIG. 12 illustrates a cross scheduling of a TDD carrier with UL/DL subframe configuration 1 by a TDD carrier with UL/DL subframe configuration 2 in accordance with certain aspects of the disclosure.

For example, FIG. 12 illustrates a cross scheduling 1200 of a TDD carrier with UL/DL subframe configuration 1 by a TDD carrier with UL/DL subframe configuration 2 in accordance with certain aspects of the disclosure. TDD CC1 1202 is a TDD carrier with UL/DL subframe configuration 2 and TDD CC2 1204 is a TDD carrier with UL/DL subframe configuration 1. As shown in FIG. 12, TDD CC2 is cross scheduled by TDD CC1. In certain aspects, for TDD CC2, under Rel-8/9/10 HARQ timing, PHICH triggering UL re-transmissions in subframes 8 and 3 are located in subframes 4 and 9 respectively. However, for TDD CC1, $m_4$=$m_9$=0. Thus, there are no PHICH resources available in subframes 4 and 9 of TDD CC1 for HARQ responses of uplink transmissions made using subframes 8 and 3 of TDD CC2.

In certain aspects, the solutions discussed above for cross scheduling of CCs involving a TDD CC with UL/DL subframe configuration 0 may be applied to solve this problem. For example, PHICH resources may be allocated for subframes 4 and 9 of TDD CC1 such that $m_4$=$m_9$=1. In an aspect the PHICH resources on subframes 4 and 9 of TDD CC1 are allocated only for new UEs. $m_4$ and $m_9$ remain 0 for legacy UEs. In an aspect, the new PHICH may be transmitted using the last CCE reserved for PDCCH.

In certain aspects, the HARQ timing may be revised. For instance, subframe 3 of TDD CC1 may transmit PHICH for both subframes 7 and 8 of TDD CC2. In certain aspects, such HARQ timing may be hard-coded (e.g. specified by the standard) or configurable (e.g. via RRC signaling).

In certain aspects, either double the PHICH resources or single PHICH resource (as discussed above) may be reserved for downlink subframes of TDD CC1. The I_PHICH may be used to indicate which subframe the PHICH is intended for. In an aspect, if double PHICH resources used, they are only visible to new UEs. In an aspect, if single PHICH resource is used, I_PHICH may be used to map PHICH of the two UL subframes of the TDD CC2 into different resources.

Figure 13:
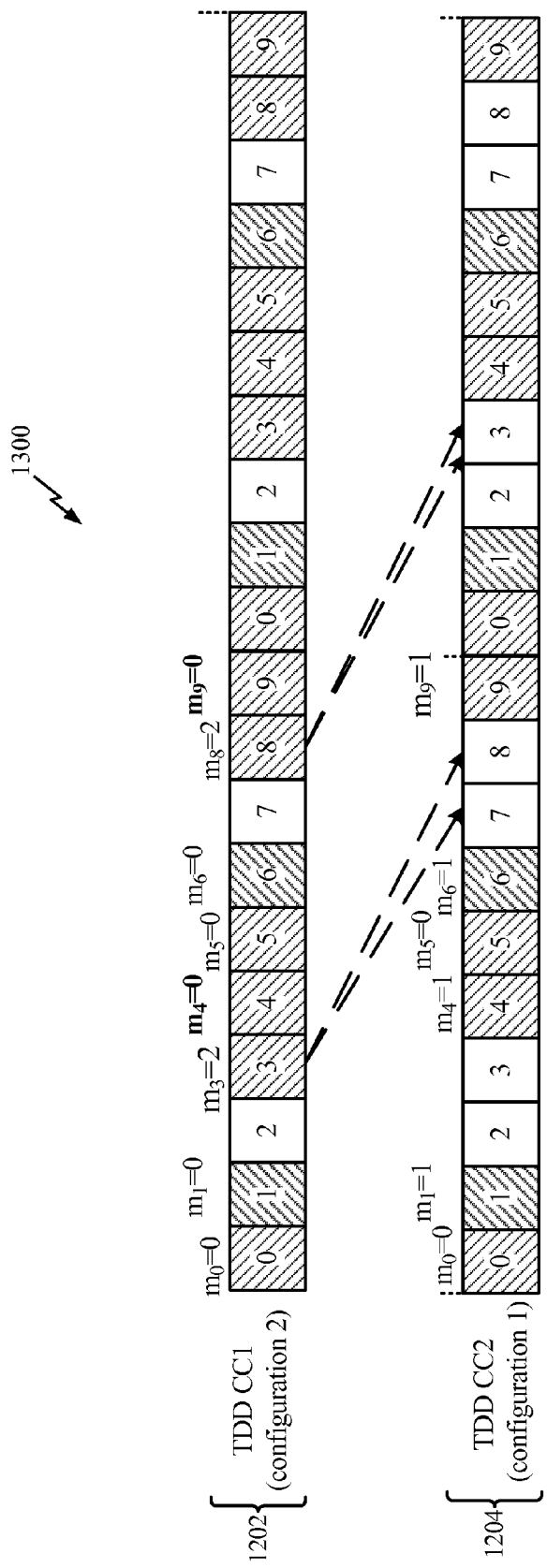
FIG. 13 illustrates a cross scheduling of a TDD carrier with UL/DL subframe configuration 1 by a TDD carrier with UL/DL subframe configuration 2, where an additional PHICH resource is allocated for subframes 3 and 8 in accordance with certain aspects of the disclosure.

FIG. 13 illustrates a cross scheduling 1300 of a TDD carrier with UL/DL subframe configuration 1 by a TDD carrier with UL/DL subframe configuration 2, where an additional PHICH resource is allocated for subframes 3 and 8 in accordance with certain aspects of the disclosure. As shown in FIG. 13, double the usual PHICH resources are allocated for subframes 3 and 8 of TDD CC1. As shown, the PHICH resources of each of the subframes 3 and 8 handle HARQ responses for two subframes of the TDD CC2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware/software/firmware depends upon the particular application and design constraints imposed on the overall system. Skilled artisans may implement the described functionality in varying ways for each particular application, but such implementation decisions should not be interpreted as causing a departure from the scope of the present disclosure.

Figure 6A:
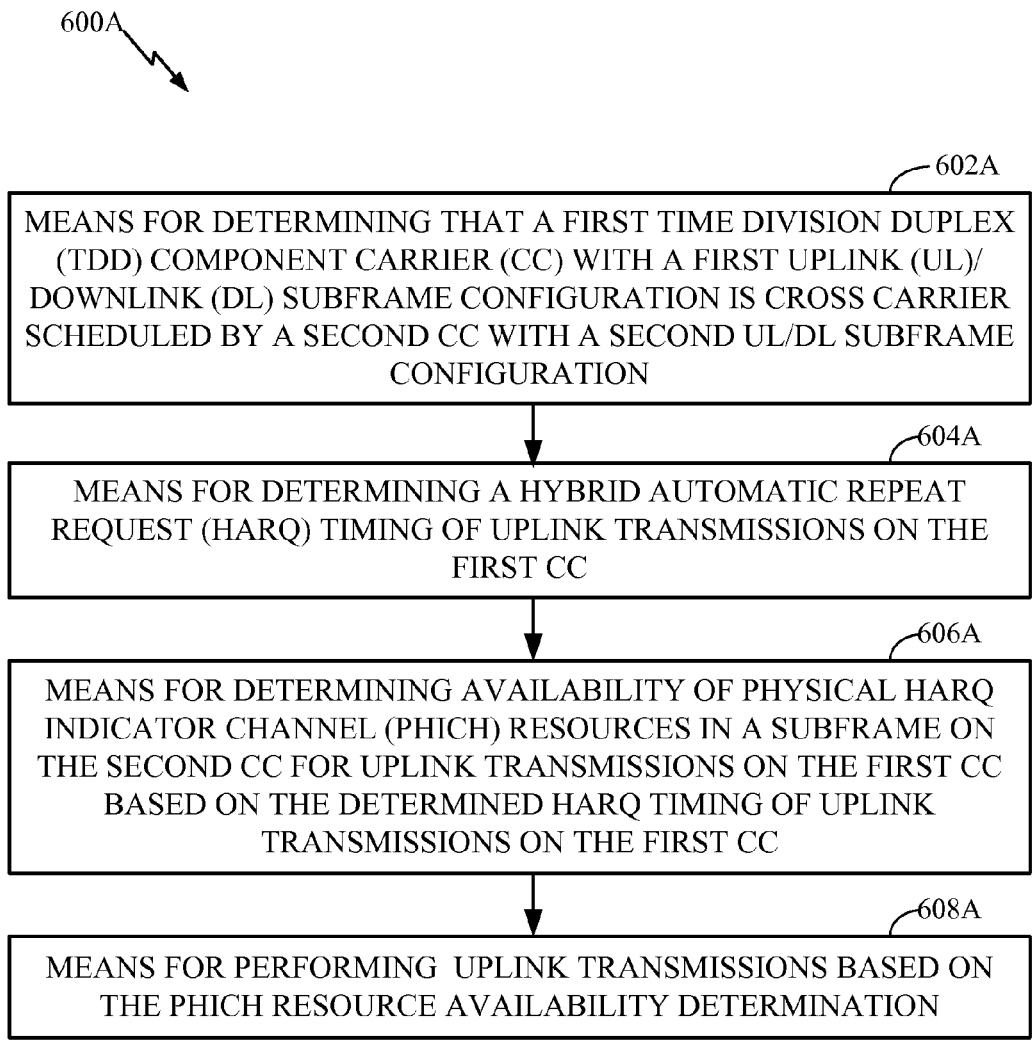
FIG. 6A is an illustrative block diagram in accordance with certain aspects of the disclosure.
Figure 7A:
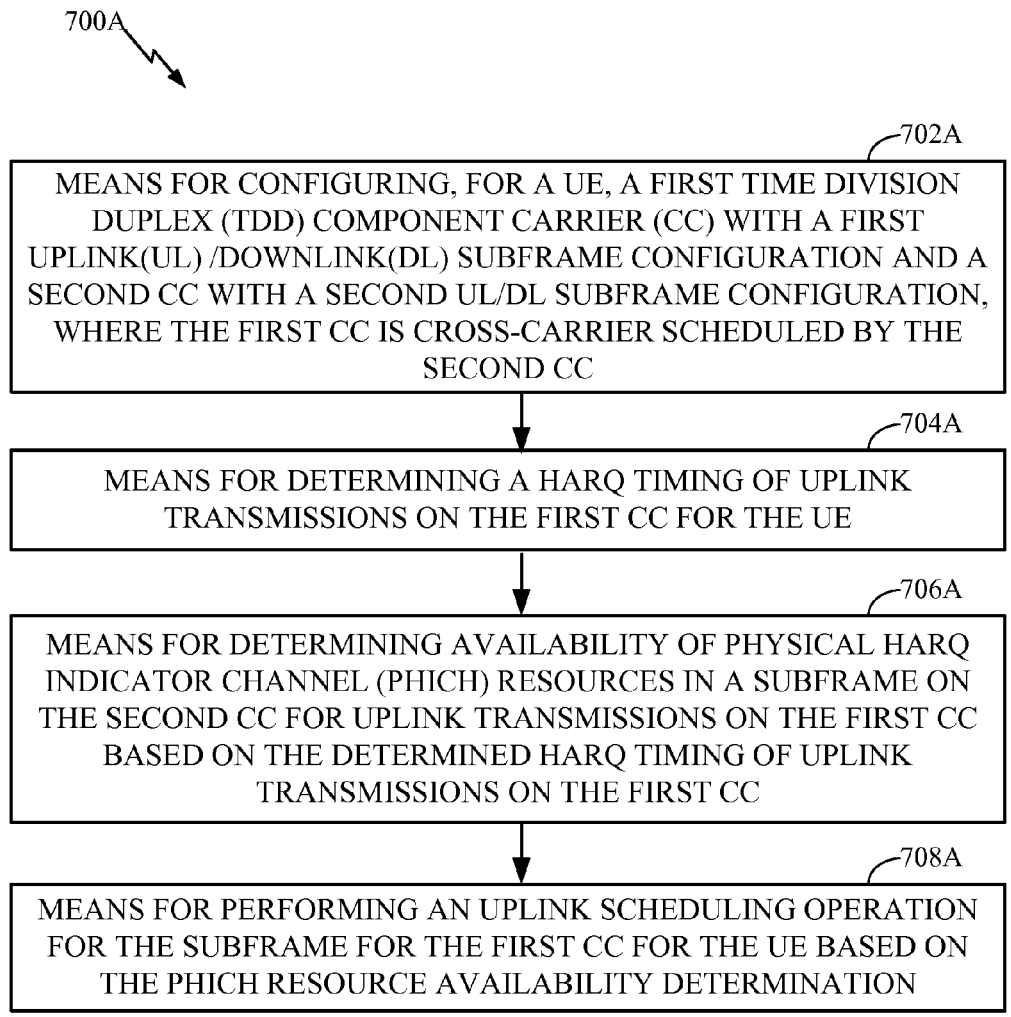
FIG. 7A is an illustrative block diagram in accordance with certain aspects of the disclosure.

The various operations of methods described above may be performed by any suitable means capable of performing the corresponding functions. The means may include various hardware and/or software/firmware components(s) and/or module(s), including, but not limited to a circuit, an application specific integrated circuit (ASIC), or processor. Generally, where there are operations illustrated in Figures, those operations may have corresponding counterpart means-plus-function components with similar numbering. For example, blocks 600 and 700 illustrated in FIGS. 6 and 7 correspond to means-plus-function blocks 600A (602A, 604A, 606A, 608A) and 700A (702A, 704A, 706A, 708A) illustrated in FIGS. 6A and 7A.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or combinations thereof. A software/firmware module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or any combination thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communication, comprising:
   determining that a first Time division duplex (TDD) Component Carrier (CC) with a first uplink (UL)/downlink (DL) subframe configuration is cross carrier scheduled by a second CC with a second UL/DL subframe configuration;
   determining a Hybrid Automatic Repeat Request (HARQ) timing of uplink transmissions on the first CC;
   determining availability of Physical HARQ Indicator Channel (PHICH) resources in a subframe on the second CC for the uplink transmissions on the first CC based on the determined HARQ timing of the uplink transmissions on the first CC; and
   performing an uplink transmission in a subframe on the first CC based on the PHICH resource availability determination.

2. The method of claim 1, further comprising reserving additional resources than normal for the PHICH in at least one downlink subframe of the second CC for HARQ responses of the uplink transmissions.

3. The method of claim 2, wherein the additional resources for the PHICH are reserved by re-using a portion of downlink channel resources.

4. The method of claim 2, wherein the additional resources for the PHICH are reserved by re-using a portion of downlink data resources.

5. The method of claim 1, further comprising determining that the HARQ timing of the uplink transmissions on the first CC is based on HARQ timing of uplink transmissions specified for the second CC.

6. The method of claim 5, wherein a set of uplink subframes in the second CC is a subset of a set of uplink subframes in the first TDD CC.

7. The method of claim 5, wherein a set of uplink subframes in the second CC is a superset of the set of uplink subframes in the first TDD CC.

8. The method of claim 1, further comprising determining that the HARQ timing of the uplink transmissions on the first CC is based on HARQ timing of uplink transmissions specified for the first CC.

9. The method of claim 1, wherein the PHICH resources are determined to be available and the method comprises, in response to the determination, determining a HARQ response based on the determined PHICH resources.

10. The method of claim 9, wherein the HARQ response is determined to be a negative acknowledgment and the method comprises performing a non-adaptive uplink data transmission in response to the determination.

11. The method of claim 1, further comprising suspending an uplink data transmission in response to a determination that the PHICH resources are unavailable.

12. The method of claim 1, wherein the PHICH resources are determined to be unavailable and the method comprises detecting a downlink control channel scheduling an uplink grant and performing an uplink data transmission in response to the uplink grant.

13. The method of claim 1, wherein the second CC comprises at least one of a Frequency Division Duplex (FDD) carrier and a TDD carrier.

14. An apparatus for wireless communication, comprising:
means for determining that a first Time division duplex (TDD) Component Carrier (CC) with a first uplink (UL)/downlink (DL) subframe configuration is cross carrier scheduled by a second CC with a second UL/DL subframe configuration;
means for determining a Hybrid Automatic Repeat Request (HARQ) timing of uplink transmissions on the first CC;
means for determining availability of Physical HARQ Indicator Channel (PHICH) resources in a subframe on the second CC for the uplink transmissions on the first CC based on the determined HARQ timing of the uplink transmissions on the first CC; and
means for performing an uplink transmission in a subframe on the first CC based on the PHICH resource availability determination.

15. The apparatus of claim 14, further comprising means for reserving additional resources than normal for the PHICH in at least one downlink subframe of the second CC for HARQ responses of the uplink transmissions.

16. The apparatus of claim 15, wherein the additional resources for the PHICH are reserved by re-using a portion of downlink channel resources.

17. The method of claim 15, wherein the additional resources for the PHICH are reserved by re-using a portion of downlink data resources.

18. The apparatus of claim 14, further comprising means for determining that the HARQ timing of the uplink transmissions on the first CC is based on HARQ timing of the uplink transmissions specified for the second CC.

19. The apparatus of claim 18, wherein a set of uplink subframes in the second CC is a subset of a set of uplink subframes in the first TDD CC.

20. The apparatus of claim 18, wherein a set of uplink subframes in the second CC is a superset of the set of uplink subframes in the first TDD CC.

21. The apparatus of claim 14, wherein the means for determining availability of PHICH resources determines that the HARQ timing of the uplink transmissions on the first CC is based on HARQ timing of uplink transmissions specified for the first CC.

22. The apparatus of claim 14, wherein the means for determining availability of PHICH resources determines that the PHICH resources are available and the apparatus comprises means for determining a HARQ response based on the determined PHICH resource.

23. The apparatus of claim 22, wherein the HARQ response is determined to be a negative acknowledgment and the apparatus comprises means for performing a non-adaptive uplink data transmission in response to the determination.

24. The apparatus of claim 14, further comprising means for suspending an uplink data transmission in response to a determination that the PHICH resources are unavailable.

25. The apparatus of claim 14, wherein the PHICH resources are determined to be unavailable and the apparatus comprises means for detecting a downlink control channel scheduling an uplink grant and means for performing an uplink data transmission in response to the uplink grant.

26. The apparatus of claim 14, wherein the second CC comprises at least one of a Frequency Division Duplex (FDD) carrier and a TDD carrier.

27. An apparatus for wireless communication, comprising:
at least one processor configured to:
determine that a first Time division duplex (TDD) Component Carrier (CC) with a first uplink (UL)/downlink (DL) subframe configuration is cross carrier scheduled by a second CC with a second UL/DL subframe configuration, determine a Hybrid Automatic Repeat Request (HARQ) timing of uplink transmissions on the first CC, determine availability of Physical HARQ Indicator Channel (PHICH) resources in a subframe on the second CC for the uplink transmissions on the first CC based on the determined HARQ timing of the uplink transmissions on the first CC, and perform an uplink transmission in a subframe on the first CC based on the PHICH resource availability determination; and
a memory coupled to the at least one processor.

28. A non-transitory computer-readable medium comprising code for:
determining that a first Time division duplex (TDD) Component Carrier (CC) with a first uplink (UL)/downlink (DL) subframe configuration is cross carrier scheduled by a second CC with a second UL/DL subframe configuration;
determining a Hybrid Automatic Repeat Request (HARQ) timing of uplink transmissions on the first CC;
determining availability of Physical HARQ Indicator Channel (PHICH) resources in a subframe on the second CC for the uplink transmissions on the first CC based on the determined HARQ timing of the uplink transmissions on the first CC; and performing an uplink transmission in a subframe on the first CC based on the PHICH resource availability determination.

29. A method for wireless communication, comprising:
configuring, for a UE, a first Time division duplex (TDD) Component Carrier (CC) with a first uplink (UL)/downlink (DL) subframe configuration and a second CC with a second UL/DL subframe configuration, where the first CC is cross-carrier scheduled by the second CC;
determining a Hybrid Automatic Repeat Request (HARQ) timing of uplink transmissions on the first CC for the UE;
determining availability of Physical HARQ Indicator Channel (PHICH) resources in a subframe on the second CC for the uplink transmissions on the first CC based on the determined HARQ timing of the uplink transmissions on the first CC; and
performing an uplink scheduling operation for a subframe for the first CC for the UE based on the PHICH resource availability determination.

30. The method of claim 29, further comprising reserving additional resources than normal for the PHICH in at least one downlink subframe of the second CC for HARQ responses of the uplink transmissions.

31. The method of claim 29, further comprising determining that the HARQ timing of the uplink transmissions on the first CC is based on HARQ timing of uplink transmissions specified for the second CC.

32. The method of claim 29, further comprising determining that a corresponding uplink data transmission for the UE is suspended in response to a determination that the PHICH resources are unavailable.

33. The method of claim 29, wherein the PHICH resources are determined to be unavailable and the method comprises transmitting a downlink control channel scheduling an uplink grant for the UE.

34. The method of claim 29, wherein the second CC comprises at least one of a Frequency Division Duplex (FDD) carrier and a TDD carrier.

35. An apparatus for wireless communication, comprising:
means for configuring, for a UE, a first Time division duplex (TDD) Component Carrier (CC) with a first uplink (UL)/downlink (DL) subframe configuration and a second CC with a second UL/DL subframe configuration, where the first CC is cross-carrier scheduled by the second CC;
means for determining a Hybrid Automatic Repeat Request (HARQ) timing of uplink transmissions on the first CC for the UE;
means for determining availability of Physical HARQ Indicator Channel (PHICH) resources in a subframe on the second CC for the uplink transmissions on the first CC based on the determined HARQ timing of the uplink transmissions on the first CC; and
means for performing an uplink scheduling operation for a subframe for the first CC for the UE based on the PHICH resource availability determination.

36. The apparatus of claim 35, further comprising means for reserving additional resources than normal for the PHICH in at least one downlink subframe of the second CC for HARQ responses of the uplink transmissions.

37. The apparatus of claim 35, further comprising means for determining that the HARQ timing of the uplink transmissions on the first CC is based on HARQ timing of uplink transmissions specified for the second CC.

38. The apparatus of claim 35, further comprising means for determining that a corresponding uplink data transmission for the UE is suspended in response to a determination that the PHICH resources are unavailable.

39. The apparatus of claim 35, wherein the PHICH resources are determined to be unavailable and the method comprises transmitting a downlink control channel scheduling an uplink grant for the UE.

40. The apparatus of claim 35, wherein the second CC comprises at least one of a Frequency Division Duplex (FDD) carrier and a TDD carrier.

41. An apparatus for wireless communication, comprising:
at least one processor configured to configure, for a UE, a first Time division duplex (TDD) Component Carrier (CC) with a first uplink (UL)/downlink (DL) subframe configuration and a second CC with a second UL/DL subframe configuration, where the first CC is cross-carrier scheduled by the second CC, determine a Hybrid Automatic Repeat Request (HARQ) timing of uplink transmissions on the first CC for the UE, determine availability of Physical HARQ Indicator Channel (PHICH) resources in a subframe on the second CC for the uplink transmissions on the first CC based on the determined HARQ timing of the uplink transmissions on the first CC, and perform an uplink scheduling operation for a subframe for the first CC for the UE based on the PHICH resource availability determination; and
a memory coupled with the at least one processor.

42. A non-transitory computer-readable medium comprising code for:
configuring, for a UE, a first Time division duplex (TDD) Component Carrier (CC) with a first uplink (UL)/downlink (DL) subframe configuration and a second CC with a second UL/DL subframe configuration, where the first CC is cross-carrier scheduled by the second CC;
determining a Hybrid Automatic Repeat Request (HARQ) timing of uplink transmissions on the first CC for the UE;
determining availability of Physical HARQ Indicator Channel (PHICH) resources in a subframe on the second CC for the uplink transmissions on the first CC based on the determined HARQ timing of the uplink transmissions on the first CC; and
performing an uplink scheduling operation for a subframe for the first CC for the UE based on the PHICH resource availability determination.

* * * * *